April 16, 1940.  J. R. VERGARA, JR  2,197,671
CONTROL MECHANISM FOR MOTOR VEHICLES
Filed July 10, 1939  2 Sheets-Sheet 1
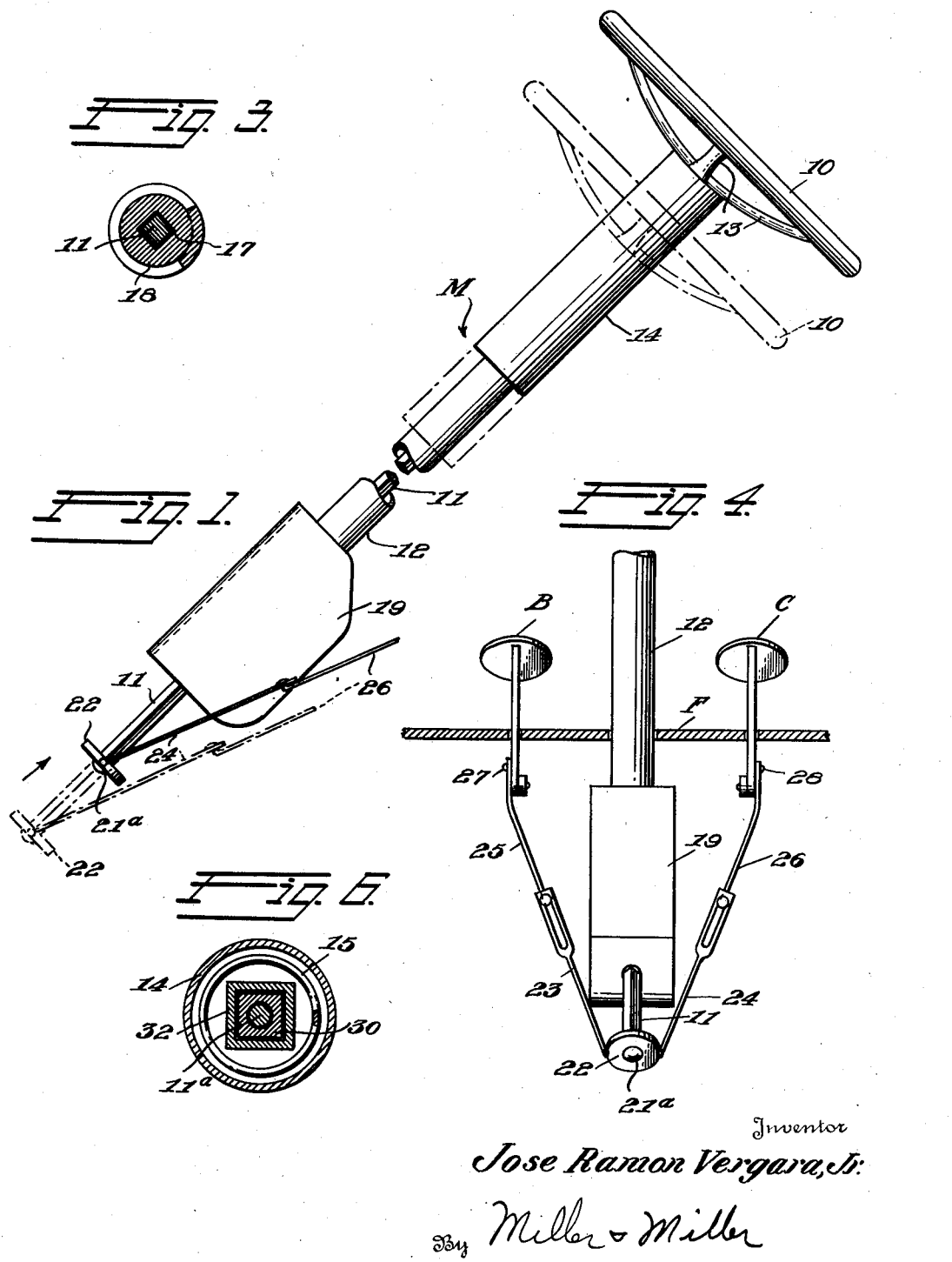
Inventor
Jose Ramon Vergara, Jr.
By Miller & Miller
Attorneys

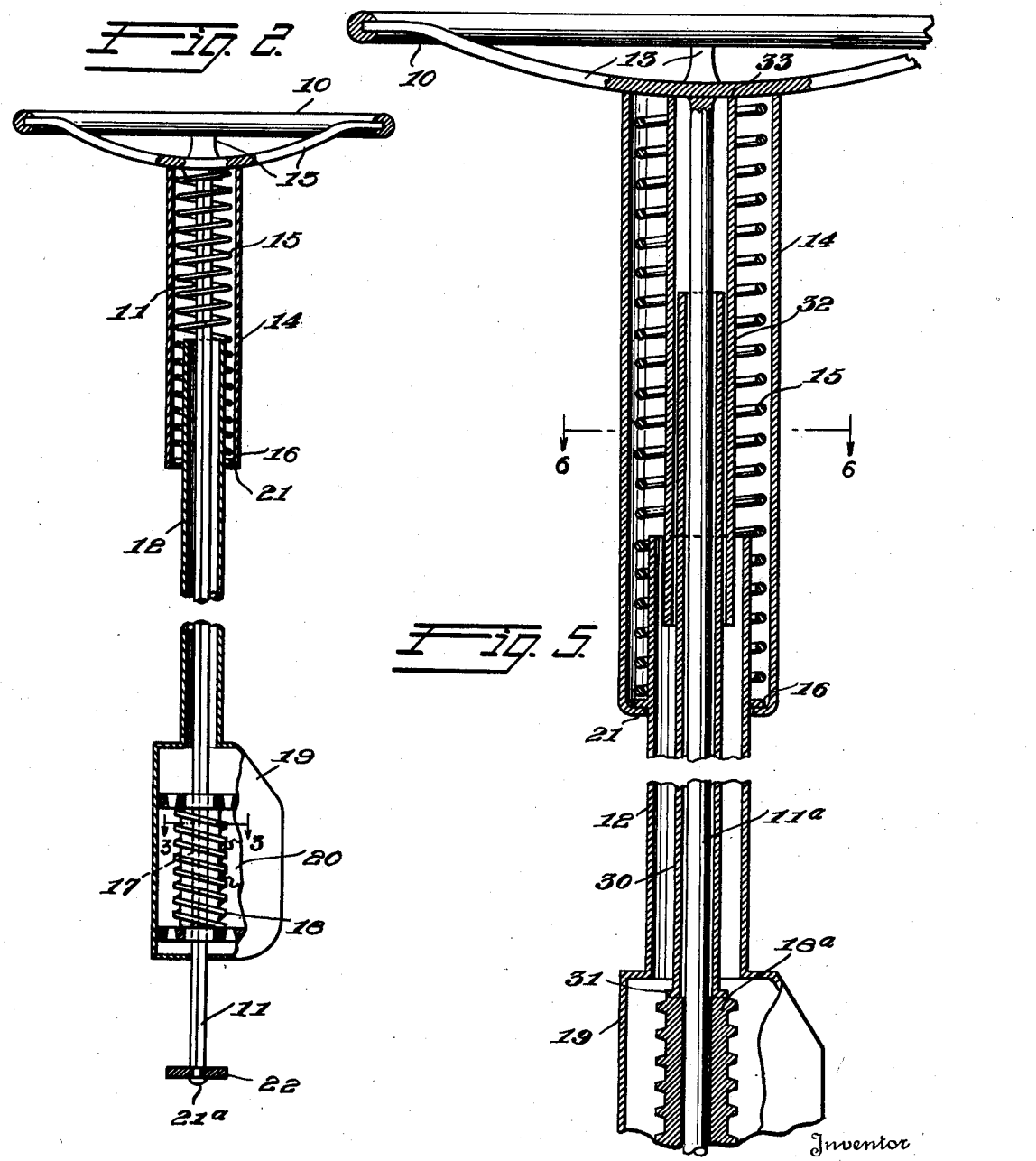

Patented Apr. 16, 1940

2,197,671

UNITED STATES PATENT OFFICE 2,197,671

CONTROL MECHANISM FOR MOTOR VEHICLES

Jose Ramon Vergara, Jr., Barranquilla, Colombia

Application July 10, 1939, Serial No. 283,670
In Colombia June 7, 1939

5 Claims. (Cl. 74—486)

The present invention relates to control means for motor-actuated vehicles and the like and more particularly to brake or brake and clutch actuating means operable by the steering wheel of the vehicle.

One of the objects of the invention is the provision of control means of the character indicated actuatable by the driver upon the exertion of downward pressure on the aforementioned steering wheel.

Still another aim is the construction of a device of the character indicated which will not interfere with the normal steering functions of the vehicle and which will not necessitate any exposed operating mechanism within the interior of the vehicle.

Yet another purpose is the provision of means which may supplant the conventional exposed emergency brake and which, in addition, is actuatable to bring the vehicle to a complete stop without the choking of the motor.

The above and other aims and objects will be apparent from the detailed description hereinafter appearing when taken in conjunction with the appended drawings forming a part hereof, to which reference will now be made and in which:

Fig. 1 is a side elevational view of a portion of a steering mechanism for a motor-actuated vehicle or the like and showing in solid and dotted lines, respectively, the inoperative and operative positions of the auxiliary clutch and brake-operating mechanism embodying the features of the invention;

Fig. 2 is a view partly in section and partly in elevation taken through the steering wheel and column of Fig. 1;

Fig. 3 is a sectional view taken on the line 3—3 of Fig. 2;

Fig. 4 is a partial elevational view looking in the direction of the arrow shown in Fig. 1;

Fig. 5 is a view similar to Fig. 2 but of a modified form of the invention; and

Fig. 6 is a sectional view taken on the line 6—6 of Fig. 5.

The invention broadly contemplates the provision of means associated with the usual steering column and steering wheel of a vehicle whereby an auxiliary control over the brake and clutch may be expeditiously attained to increase the safe control of the vehicle. The location of an emergency brake either on the floor or beneath the dashboard of a vehicle requires the driver, in order to actuate the same, to remove his hands from the steering wheel, which is frequently undesirable if a collision is to be avoided. According to the instant invention, a slight downward pressure by the driver on the steering wheel will simultaneously actuate both the clutch and brake pedals of the vehicle without in any way interfering with the normal steering functions thereof.

Referring first to Figs. 1 to 4, inclusive, of the drawings, the reference character M designates generally a steering mechanism including a steering wheel 10, a steering post 11 secured thereto, and a stationary housing or column 12 for said post. The steering wheel 10 is provided with a plurality of spokes 13, as is conventional, and the post 11 is secured thereto as well as a tubular casing 14, the latter extending downwardly from the wheel to partially enclose the upper portion of the housing or column 12. Housed within the casing 14 is a coil spring 15, the post 11 extending axially therethrough and the lower portion of said spring loosely and circumferentially receiving the upper portion of the column 12. The bottom end of the spring 15 rests on a pin or the like 16 rigidly fastened to the housing 12.

The post 11 is preferably of square or rectangular cross section (see Fig. 3) and passes axially through a complementary aperture 17 provided in a worm 18, which is mounted for rotary movement only in an enlarged portion 19 of the housing 12. The worm meshes with a gear 20 connected to the steering rods and knuckles of a vehicle in the conventional manner.

From the above description, it will be seen that a downward pressure upon the steering wheel 10 will cause the rod 11 to move axially through the worm 18, causing compression of the spring 15 and telescopic movement of the casing 14 with respect to the housing 12—see dotted line position in Fig. 1. The operative steering relationship between the rod 11 and the worm 18 is not affected due to the complementary character and fit of the rod 11 and the aperture 17 in said worm. Release of pressure on the steering wheel will result in an upward movement of the wheel and rod 11, which movement is limited by an annular lower lip 21 integral with the casing 14, which lip engages the fixed pin 16.

The lowermost portion of the post 11 is rotatably mounted, as at 21ª, in a non-rotatable disc or the like 22, to which is pivotally secured, on opposite sides thereof, a pair of similar slotted rods 23 and 24, respectively. Slidably connected at one end thereof to the rods 23 and 24 are similar links 25 and 26, respectively, the opposite ends of said links being, respectively, pivoted, as at 27 and 28 to the brake pedal B and clutch pedal C extending through the floorboards F of the vehicle.

It will now be seen that downward pressure on the steering wheel 10 will, through the rods 23, 24, and links 25, 26 actuate the brake pedal B and clutch pedal C, which are, of course, operatively connected to the brakes and clutch of the vehicle. The slotted connections between the rods 23 and 24 and links 25 and 26 permits actuation of the pedals B and C in the usual manner without disturbing the normal position of the steering wheel.

In the form of the invention shown in Figs. 5 and 6, the rod 11ª is secured to the spokes 13, as in the form of the invention described in Figs. 1 to 4, inclusive. However, the rod 11ª is of circular cross section and loosely passes in nonengaging relationship through the worm 18ª. The latter is rigidly secured to the bottom of a hollow column 30, as at 31, said column 30 being of square cross section (see Fig. 6) and extends partially into the casing 14 and has the rod 11ª passing axially therethrough. Slidably engaging the column 30 is a complementary-shaped casing 32 secured, as at 33, to the spokes 13 of the steering wheel 10.

From the above description, it will now be understood that downward pressure on the steering wheel 10 against the spring 15 will produce axial movement of the rod 11ª through the members 12, 30 and worm 18ª to actuate the clutch and brake pedals B and C, as in Figs. 1 to 4, inclusive. Members 30 and 32 have telescopic axial movement and are operatively engaged at all times, so that rotation of the wheel 10 will impart rotary movement to the members 32 and 30, the latter producing rotation of the worm 18ª to operate the steering rods and knuckles of the vehicle. Thus actuation of the steering mechanism is possible at all times irrespective of whether the steering wheel 10 is in the full or dotted line positions shown in Fig. 1.

While the invention has been described in detail it is apparent that obvious changes and modifications may be made therein. Thus, by omitting any connection between disc 22 and the clutch C only the brake pedal B will be actuated. By gradual actuation of the steering wheel in a downward direction graduated braking action will be attained as by direct normal operation of brake pedal B. It will be noted that all of the essential elements are fully encased and with the exception of a slightly enlarged diameter of a portion of the steering column the appearance of the latter is substantially as is conventional.

What I claim and desire to secure by Letters Patent is:

1. A control mechanism for vehicles having a steering wheel and column and a brake mechanism, a rod secured to such steering wheel and axially movable through said column upon the exertion of pressure on said wheel, spring means adjacent said wheel for returning the wheel to normal position, said rod being connected to said brake mechanism, means connecting said wheel to the steering mechanism of the vehicle, and means for applying said brake from said wheel without disturbing the operation of the steering mechanism.

2. A control mechanism for vehicles having a steering wheel, steering column and a brake and clutch mechanism, a hollow casing secured to said wheel, a rod fastened to said wheel and axially movable through said column, spring means within such casing resisting movement of said rod, said rod being connected to said brake and clutch mechanism, means connecting said wheel to the steering mechanism of the vehicle, and means for applying said brake and clutch simultaneously by said wheel and rod without disturbing the operation of the steering mechanism.

3. A control mechanism for vehicles having a steering wheel and column and a brake mechanism, a hollow casing secured to said wheel, a rod fastened to said wheel and axially movable through said column, a spring means within said casing extending circumferentially of said rod and resisting movement of said rod, a worm connected to the steering mechanism of the vehicle, said worm having an aperture receiving said rod whereby said worm may be operated for actuating the steering mechanism of the vehicle, said rod being connected to said brake mechanism for operating same upon axial movement thereof.

4. A control mechanism for vehicles having a steering wheel and a brake and clutch mechanism, a hollow casing and a spaced tubular member within said casing both secured to said wheel, a rod fastened to said wheel and extending axially through such casing and member, a spring within said casing resisting movement of said rod, a second tubular column slidably and operatively connected to said tubular member, a steering worm fastened to the lowermost portion of said tubular column, said worm having an aperture slidably receiving said rod for nonactuation of said worm, said rod being connected to said brake and clutch mechanism for operating same upon axial movement thereof.

5. A control mechanism for vehicles having a steering wheel and column and vehicle speed control means, a rod axially movable through said column and actuatable by the exertion of force on said steering wheel, means for returning said wheel to normal condition upon the release of the force thereon, said rod being connected to said vehicle speed control means, means connecting said wheel to the steering mechanism of the vehicle, and means for actuating said vehicle speed control means without disturbing the operation of the steering mechanism.

JOSE RAMON VERGARA, Jr.